Patented Aug. 15, 1950

2,518,577

UNITED STATES PATENT OFFICE 2,518,577

STABILIZATION OF ORGANIC COMPOUNDS

Ralph B. Thompson and Joseph A. Chenicek, Riverside, Ill., assignors to Universal Oil Products Company, Chicago, Ill., a corporation of Delaware No Drawing. Application April 29, 1947,
Serial No. 744,768

5 Claims. (Cl. 44—75)

1

This application is a continuation in part of our copending application Serial No. 658,207 filed March 29, 1946, now Patent No. 2,462,237, dated February 22, 1949.

This invention relates to the stabilization of organic compounds which tend to deteriorate in storage or in use due to undesirable oxidation reactions.

Various organic compounds including motor fuel, mineral oil, lubricating oil, drying oil, rubber, animal and vegetable fats and oils, etc., are adversely affected by oxygen, with the resultant formation of undesirable gums and usually discoloration of the organic compound, as well as other deleterious reactions. This is particularly true of motor fuels comprising olefinic gasolines, such as cracked gasoline and polymer gasoline.

One object of the present invention is to prevent or at least substantially retard the undesirable deterioration of organic compounds. Another object of the invention is to provide a novel inhibitor which will function to stabilize organic compounds.

Various inhibitors heretofore have been proposed for this purpose, among which is benzyl aminophenol (B. A. P.). While B. A. P. is effective as an inhibitor, we have found that unexpectedly improved results are obtained by modification in accordance with the teachings of the present invention.

In a broad aspect the present invention relates to a method of stabilizing an organic compound against deterioration by oxygen which comprises incorporating therein an N-(hydroxybenzyl)-p-aminophenol in a small but effective amount to retard said deterioration.

In a specific embodiment the present invention relates to a method of stabilizing cracked gasoline against deterioration by oxygen which comprises incorporating therein N-(4-hydroxybenzyl)-p-aminophenol in an amount of less than 1% by weight.

In another specific embodiment the present invention relates to a method of stabilizing cracked gasoline against deterioration by oxygen which comprises incorporating therein N-(3-methoxy-4-hydroxybenzyl)-p-aminophenol in an amount of from about 0.0001% to about 0.01% by weight.

In another specific embodiment the present invention relates to a method of stabilizing cracked gasoline against deterioration by oxygen which comprises incorporating therein N-(2-hydroxy-5-methylbenzyl)-p-aminophenol in an

2 amount of from about 0.0001% to about 0.01% by weight.

As hereinbefore set forth, we have found that N-(hydroxybenzyl)-p-aminophenols are of unexpectedly higher potency as inhibitors than B. A. P. For example, when used for the stabilization of Pennsylvania cracked gasoline, the addition of 0.005% by weight of B. A. P. resulted in an induction period of 465 minutes, whereas a similar amount of N-(p-hydroxybenzyl)-p-aminophenol when added to another sample of the same gasoline resulted in an induction period of 735 minutes. It is thus seen that the hydroxy substituted benzyl compounds of the present invention exert an unexpectedly high improvement as compared to B. A. P.

The improved inhibitors of the present invention may be represented by the following formula:

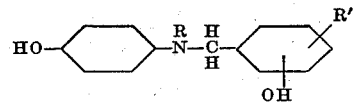

where R is selected from the group consisting of hydrogen and hydrocarbon radicals, and R' is selected from the group consisting of hydrogen, hydrocarbon and alkoxy radicals.

Suitable compounds of the present invention include N-(4-hydroxybenzyl)-p-aminophenol, N-methyl-N-(4-hydroxybenzyl)-p-aminophenol, N-(2-hydroxy-5-methylbenzyl)-p-aminophenol, N-(2-hydroxybenzyl)-p-aminophenol, N-(2-hydroxy-3,5-di-tert-butylbenzyl)-p-aminophenol, N-(4-hydroxy-3,5-di-tert-butylbenzyl)-p-aminophenol, N-methyl-N-(4-hydroxy-3-propylbenzyl)-p-aminophenol, etc.

Another suitable class of compounds include those in which R' in the above general formula is an alkoxy group including methoxy, ethoxy, propoxy, etc. However, it is essential that the benzyl ring contains a hydroxy radical attached thereto in addition to the alkoxy radical. As will be shown in the examples appended to the present specification, a compound containing two alkoxy groups attached to the benzyl ring namely, N-(3-methoxy-4-ethoxybenzyl)-p-aminophenol is only about one-half as effective as a similar compound containing a hydroxy radical in place of the ethoxy radical namely, N-(3-methoxy-4-hydroxybenzyl)-p-aminophenol and, in fact, the dialkoxy-substituted compound is not as potent as B. A. P.

It is understood that the inhibitors specifically set forth are merely typical illustrations of suitable compounds which may be employed in accordance with the broad scope of the present invention. It is understood that the aminophenol ring may also contain substituent groups attached thereto and particularly hydrocarbon substituent groups.

It is understood that the numerous inhibitors which may be utilized in accordance with the present invention are not necessarily equivalent in their potency and other properties, and that the exact inhibitor to be utilized will depend upon the particular organic compounds to be treated.

The inhibitor of the present invention will usually be added to gasoline in an amount of less than 0.1% by weight and generally in an amount of from about 0.0001% by weight to about 0.01%. The exact amount required will depend upon the particular organic compound being treated and upon the potency of the specific inhibitor selected.

The following examples are introduced to illustrate further the novelty and utility of the present invention but not with the intention of unduly limiting the same.

The gasoline utilized in the following examples comprised a Pennsylvania cracked gasoline which had an induction period of about 100 minutes in the absence of an added inhibitor. Upon the addition of 0.005% by weight of B. A. P. the induction period of the gasoline was increased to about 465 minutes.

*Example I*

N-(4-hydroxybenzyl)-p-aminophenol was prepared by reacting p-hydroxybenzaldehyde with p-aminophenol and reducing the resultant product with hydrogen in the presence of a nickel catalyst. When added in an amount of 0.005% by weight to a sample of the Pennsylvania cracked gasoline, the induction period thereof was 735 minutes, which is an increase of 270 minutes as compared to B. A. P.

*Example II*

N-(2-hydroxy-5-methylbenzyl)-p-aminophenol was prepared by reacting 2-hydroxy-5-methylbenzaldehyde with p-aminophenol and reducing the resultant product with hydrogen in the presence of a nickel catalyst. When added to another sample of the Pennsylvania cracked gasoline, 0.005% by weight of N-(2-hydroxy-5-methylbenzyl)-p-aminophenol increased the induction period of the gasoline to 745 minutes, which is an increase of 280 minutes as compared to B. A. P.

*Example III*

N-(3-methoxy-4-hydroxybenzyl)-p-aminophenol was prepared by dissolving p-aminophenol and vanillin in methanol and heating the mixture on a steam bath. The resultant N-(3-methoxy-4-hydroxybenzal)-p-aminophenol was crystallized from methanol and melted at 197–198° C. The product was suspended in methanol and then reduced with hydrogen in the presence of a nickel catalyst. The catalyst was removed by filtration, the alcohol was evaporated, and the product was crystallized from ethyl acetate. The final product had a melting point of 167–169° C.

When added to another sample of the Pennsylvania gasoline, 0.005% by weight of N-(3-methoxy-4-hydroxybenzyl)-p-aminophenol prepared in the above manner raised the induction period of the gasoline to 640 minutes, which is an increase of 175 minutes as compared to B. A. P.

*Example IV*

N-(3-methoxy-4-ethoxybenzyl)-p-aminophenol was prepared in the manner similar to that described in Example III except that 3-methoxy-4-ethoxybenzaldehyde was substituted for the vanillin. The N-(3-methoxy-4-ethoxybenzal)-p-aminophenol melted at 163–165° C. and the final product which was crystallized from methanol melted at 133–134° C.

When added to another sample of the Pennsylvania gasoline, 0.005% by weight of N-(3-methoxy-4-ethoxybenzyl)-p-aminophenol increased the induction period of gasoline to only 375 minutes. It will be noted that the increase so obtained is less than the 465 minutes obtained with B. A. P.

We claim as our invention:

1. Cracked gasoline containing from about 0.0001% to about 0.01% by weight of an inhibitor having the formula:

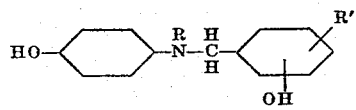

where R is selected from the group consisting of hydrogen and hydrocarbon radicals, and R' is selected from the group consisting of hydrogen, hydrocarbon and alkoxy radicals.

2. Cracked gasoline containing an N-(hydroxybenzyl)-p-aminophenol.

3. Cracked gasoline containing from about 0.0001% to about 0.01% by weight of N-(4-hydroxy benzyl)-p-aminophenol.

4. Cracked gasoline containing from about 0.0001% to about 0.01% by weight of N-(3-methoxy-4-hydroxy benzyl)-p-aminophenol.

5. Cracked gasoline containing from about 0.0001% to about 0.01% by weight of N-(2-hydroxy-5-methyl benzyl)-p-aminophenol.

RALPH B. THOMPSON.
JOSEPH A. CHENICEK.

REFERENCES CITED

The following references are of record in the file of this patent:

UNITED STATES PATENTS

| Number | Name | Date |
|---|---|---|
| 1,980,200 | Hannum | Nov. 13, 1934 |
| 2,063,151 | Dahlen et al. | Dec. 8, 1936 |
| 2,107,147 | Elley et al. | Feb. 1, 1938 |